(12) United States Patent
Duron et al.

(10) Patent No.: US 8,391,804 B2
(45) Date of Patent: Mar. 5, 2013

(54) CLOSE PROXIMITY ANTENNA MEASUREMENT AND TUNING

(75) Inventors: Mark W. Duron, East Patchogue, NY (US); Rehan K. Jaffri, New York, NY (US); Richard T. Knadle, Dix Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 195 days.

(21) Appl. No.: 13/051,075

(22) Filed: Mar. 18, 2011

(65) Prior Publication Data
US 2012/0238210 A1 Sep. 20, 2012

(51) Int. Cl.
*H04B 1/04* (2006.01)
(52) U.S. Cl. .................. 455/78; 455/121; 455/125
(58) Field of Classification Search .............. 455/73, 455/78, 80, 82, 91, 115.1, 115.2, 115.3, 120, 455/121, 124, 125, 126
See application file for complete search history.

(56) References Cited

U.S. PATENT DOCUMENTS

| | | | |
|---|---|---|---|
| 5,410,319 A | 4/1995 | Lopez et al. | |
| 8,213,886 B2 * | 7/2012 | Blin | 455/123 |
| 2005/0003771 A1 * | 1/2005 | De Ruijter et al. | 455/127.1 |
| 2006/0252391 A1 * | 11/2006 | Poilasne | 455/121 |

* cited by examiner

*Primary Examiner* — Thanh Le
(74) *Attorney, Agent, or Firm* — Brian M. Mancini

(57) ABSTRACT

A method and apparatus for providing close proximity antenna measurement and tuning, includes a first receive-only antenna, a second antenna operable in a transmit mode, a tuning circuit coupled to the first antenna, a transmitter coupled to the second antenna, a receiver coupled to the first antenna, the receiver operable to measure a power into the first antenna delivered by a signal from the second antenna driven by the transmitter, and a processor coupled to the tuning circuit, transmitter, and receiver, the processor operable to step changes in the tuning circuit until a substantially maximum power of the signal is measured by the receiver.

12 Claims, 3 Drawing Sheets

CLOSE PROXIMITY ANTENNA MEASUREMENT AND TUNING

FIELD OF THE DISCLOSURE

The present invention relates generally to wireless communication systems, and in particular, to a mechanism for providing close proximity antenna measurement and tuning.

BACKGROUND

At present, there are wireless communication systems which demand the use of antenna diversity, such as in fourth generation Long Term Evolution (4G LTE) communication systems. These LTE systems can utilize different antenna configurations including multiple-input, multiple-output (MIMO) spatial-diversity antennas, multiple-input, single-output (MISO) transmit-diversity antenna, and single-input, multiple-output (SIMO) receive-diversity antennas, including beamforming variations. As a result, there is a need to properly tune these antennas. This can be problematic if a given antenna is a receive-only antenna, which is the case for some LTE systems, for example.

In order to tune an antenna, the antenna must first be measured and then that information can be used to determine the degree of tuning that is applied to the antenna. This measurement is normally achieved by measuring the ratio of energy applied to the antenna versus the energy measured reflecting from the antenna. In the case of most antennas, the antenna measurements can be done during manufacturing, and the results used to compensate the antenna while in use.

However, this approach can be problematic when dynamic variables affecting the antenna(s) while in use need to be compensated for. As an example; if the device that contains the antennas is of the handheld type, the presence of a user's hand holding the device may detune the antennas. Therefore, the antenna measurements made at the factory during manufacturing of the device may no longer be valid in the presence of hand-loading of the antenna(s).

One solution is to perform active antenna measurements while the device is in use to accurately determine the degree of hand-loading, and therefore the degree of compensation to apply to retune the antenna to the correct frequency, and to maximize power transfer into the antenna. However, this solution can be problematic if the antenna is a receive-only antenna, as in the case of a diversity LTE antenna which is receive only. If no power can be applied directly to the antenna, it is difficult to know the antenna performance.

The only way currently to assess the antenna performance is to measure the quality of the received data. This, however, is a measurement of the entire system, including the base station and the channel condition due to obstructions between the handheld unit and the signal source (the base station).

Accordingly, what is needed is a technique to measure antenna performance while a communication device is in use. It would also be of benefit to provide a technique that can measure a receive-only antenna, and to measure an antenna in close proximity to another antenna.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
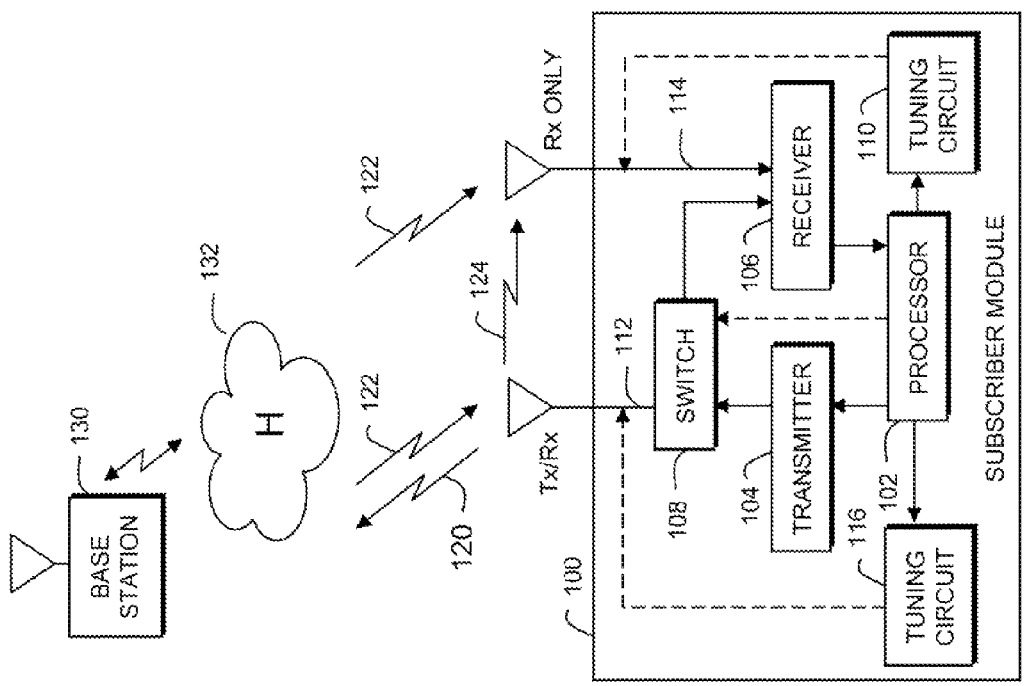
FIG. 1 is a simplified block diagram of a system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a technique to measure and tune antenna performance while a communication device is in use. It particular, the present invention provides a technique that can measure and tune a receive-only antenna while it is in close proximity to another antenna. As used in the example herein, a communication device is provided that uses two antennas, a first receive-only antenna, and a second antenna that can transmit and receive. When the device is transmitting a signal, it uses only the second antenna, and when the device is receiving a signal, it can use the first or both antennas. Alternatively, the communication device can operate in full duplex mode where it can transmit and receive simultaneously on a single antenna.

Specifically, the present invention provides the ability to measure and tune the performance of a receive-only antenna while in use by simply measuring the energy radiated by a transmit antenna of the device with the receive-only antenna while that transmit antenna is transmitting in the same band as the receive antenna. This measurement can then be analyzed to assess the degree of compensation applied to the receive-only antenna. Even if the transmit antenna reverts to a receive mode or switches frequency bands, the receive antenna can operate at improved efficiency by maintaining the correction coefficients in effect when the transmitter is turned off or switched bands. Normally both antennas are designed for maximum isolation between one another. However, some degree of coupling will always exist between them, due to their close proximity This coupling between the close proximity antennas is used by the present invention to measure and correct the effects of hand-loading and other environmental effects upon one or both of the antennas.

The wireless communication network as described herein can include not only an LTE communication network, but also WiMax networks, other IEEE 802.11 wireless communication systems, or local area networks such as Wi-Fi networks, modified to implement embodiments of the present invention.

FIG. 1 is a block diagram depiction of a system in accordance with the present invention. A plurality of network entities are shown, which can support a 4G LTE wireless communication network for example, in accordance with the present invention. Those skilled in the art will recognize that FIG. 1 does not depict all of the equipment necessary for network to operate but only those network components and logical entities particularly relevant to the description of embodiments herein. Base stations and mobile devices can all include separate processors, communication interfaces, transceivers, memories, etc. In general, components such as processors, transceivers, memories, and interfaces are well-known. For example, processing units are known to comprise basic components such as, but not limited to, microprocessors, microcontrollers, memory, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

Referring back to FIG. 1, a base station (BS) 130 is operable to communicate with one or more subscriber modules (SM) 100, such as an LTE system. For example, the communication system can utilize an Orthogonal Frequency Division Multiplexed (OFDM) or multicarrier based architecture. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In addition, in alternate embodiments the communication system may utilize other cellular communication system protocols such as, but not limited to, TDMA, direct sequence CDMA (DS-CDMA), and the like.

The BS 130 includes one or more transmit antennas communicating a data stream to an SM 100. Any transmission 122 from the base station 130 has been modulated, coded, and multiplied by transmit weights before being fed to the BS transmit antenna(s), as is known in the art. The transmit weights are based on at least a partial channel response, to tailor spatial diversity of the transmission. The transmission 122 form the BS transmit antenna(s) propagates through a matrix channel H 132.

The SM 100 in this example includes at least two receive-capable antennas. In particular, the SM includes at least a first antenna 114 that is a receive-only antenna, and at least a second antenna 112 that can operate as either a receive antenna or a transmit antenna. The transmission 122 from the BS is received by at least one of the receive antennas 112, 114 of the SM 100 and is then demodulated by a receiver 106 and decoded by a processor 102.

The SM 100 also includes a switch 108 that operates to switch the second antenna 112 between a receive functional mode or a transmit functional mode. The switch can be realized in many different configurations as are known in the art including a duplexer, diplexer, or any other type of switching apparatus that may or may not be under control of the processor 102. During a transmit mode of the SM, the switch 108 must connect a transmitter 104 to the Tx/Rx second antenna 112 in order to send a signal 120 to the BS. During a receive mode of the SM, the switch 108 may connect the Tx/Rx second antenna 112 to the receiver 106 such that the SM has two receive antennas 112, 114 for spatial diversity.

In accordance with the present invention, the SM 100 also includes a tuning circuit 110 for the receive-only antenna 114. The SM can also include a tuning circuit 116 for the Tx/Rx antenna 112. Optionally, the tuning circuit 116 can provide different tuning for the second antenna 112 depending on whether it is in receiver or transmit mode. During manufacture, tuning of the second antenna 112 is relatively straight forward since a signal can be injected into the antenna by the transmitter 104 and the tuning circuit 116 can be adjusted to minimize the reflection coefficient (i.e. $S_{11}$) of the signal that is reflected back. However, the receive-only antenna 114 can not be directly tuned this way since there is no signal injector available to it.

The present invention solves this problem by using signals 124 received by the receive-only antenna 114 from second antenna 112 during transmit mode for tuning the receive-only antenna 114. In particular, when the transmitter 104 is transmitting, the receiver 106 can use an envelope detector to detect a power level of the signal 124 emanating from the second antenna 112. It can be reasonably assumed in this case that signal 124 will be much greater than any received signal 122 in the band from the BS, due to the close proximity of the transmit antenna, even where the antennas 112, 114 have good isolation. The tuning circuit 110 can change tuning of the first antenna 114 in small steps (increments and/or decrements) until a maximum power of the signal 124 is measured by the envelope detector. For example, after an initial measurement by the envelop detector, the tuning circuit can be incremented, and another measurement can be made. If an increase power is detected, then it is determined that the tuning was in the right direction, and more increments are used for subsequent measurements until no further improvements are realized. If a decrease power is detected after the tuning circuit change, then it is determined that the tuning was in the wrong direction, and decrements are used for subsequent measurements until no further improvements are realized.

The above procedure is predicated on different factors. Firstly, the transmitter 104 and receiver 106 should be operating within the same frequency band when this occurs. The exact same frequency is not required as long as the operating frequencies of the transmitter and receiver are within this operational bandwidth of the envelop detector, which can be coordinated by the processor 102. Secondly, the second antenna 112 should be in transmit mode, i.e. both antennas 112, 114 are not receiving. Thirdly, the transmitter may be changing its output power during the receiver measurements of the signal 124, due to base station commands for the transmitter to change its output power, which must be accommodated during the measurement, as will be detailed below with respect to FIG. 2.

Figure 2:
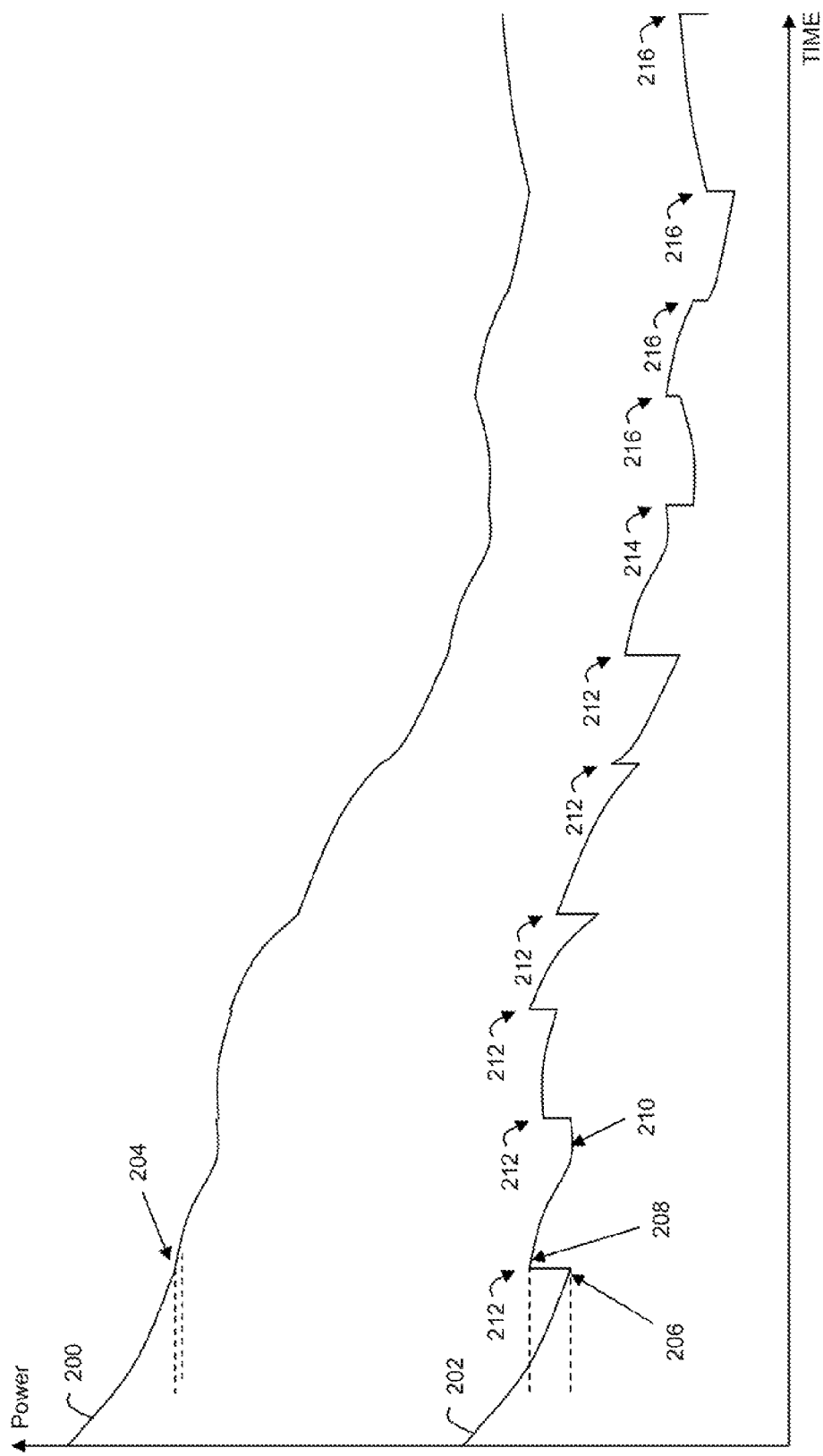
FIG. 2 is a graphical representation of the operation of FIG. 1.

Referring to FIG. 2, two curves are shown that demonstrate: the change of transmitter power with time 200, and the change of measured power of the transmitter antenna by the receive-only antenna with time 202, including changes by the receive-only antenna tuning circuit. In normal operation, the BS commands the SM to adjust its transmitter output power 200 to maintain a good signal level as received by the base station. This compensates for channel conditions, environmental variables, and spatial nulls and peaks caused by multipath, as is known in the art. As a result, transmitter power will exhibit short term changes in power over time 204. As shown here, the transmitter power exhibits a long term trend for slowly lowering power output.

In one embodiment, to mitigate these short term power changes, the processor will direct the receiver envelope detector to make a series of brief sequential power measurements immediately before 206 and after 208 the receiver-only antenna tuning circuit change. Alternatively and additionally, since the processor knows when it directs the BS-commended transmitter power changes, it can direct the envelop detector to make the brief sequential power measurements before and after it directs the transmitter power changes. In this way, the longer term changes caused by the BS power control can be mitigated. In the example shown 202, the sequential measurements 206, 208 show an improvement with the tuning change, whereas if further-apart measurements were made 206, 210 no improvement would be shown due to the lowering transmitter power.

As shown, the tuning circuit is making changes 212 that improve the received power, and therefore improves the receive antenna tuning, at each change. Tuning changes 212 keep being made until a change 214 that results in a worsening of received power. At this point, a maximum point in the tuning has just been passed. One option is to keep this one tuning point for a predetermined time period, since it is close to, or at, an optimum receive-only antenna tuning solution. Another option is to subsequently alternate incrementing and decrementing the antenna tuning as needed (216 as shown) to always keep the receive-only antenna tuning near an optimum solution (i.e. a maximum power), in order to compensate for changing conditions such as a user moving their hands near the antennas on the SM.

In another embodiment, the processor knows the transmitter power setting and can detect a relative change between the transmit power and detected receive-only antenna power for each change in the receive-only antenna tuning. In this way, only a single receiver measurement needs to be made after each tuning change, which can result in a quicker optimization of the antenna tuning.

The present invention can also be used to measure and tune the transmit antenna as well. Any change in the transmitter tuning will cause a change in the transmit antenna output power, and resultantly in the receive power measured. Therefore, given a known transmitter power setting, and changing a tuning of the transmit antenna, will result in a change of received power measured, which can be fed back through the processor to adjust the transmit antenna tuning, similar to the tuning described above for the receive-only antenna.

Figure 3:
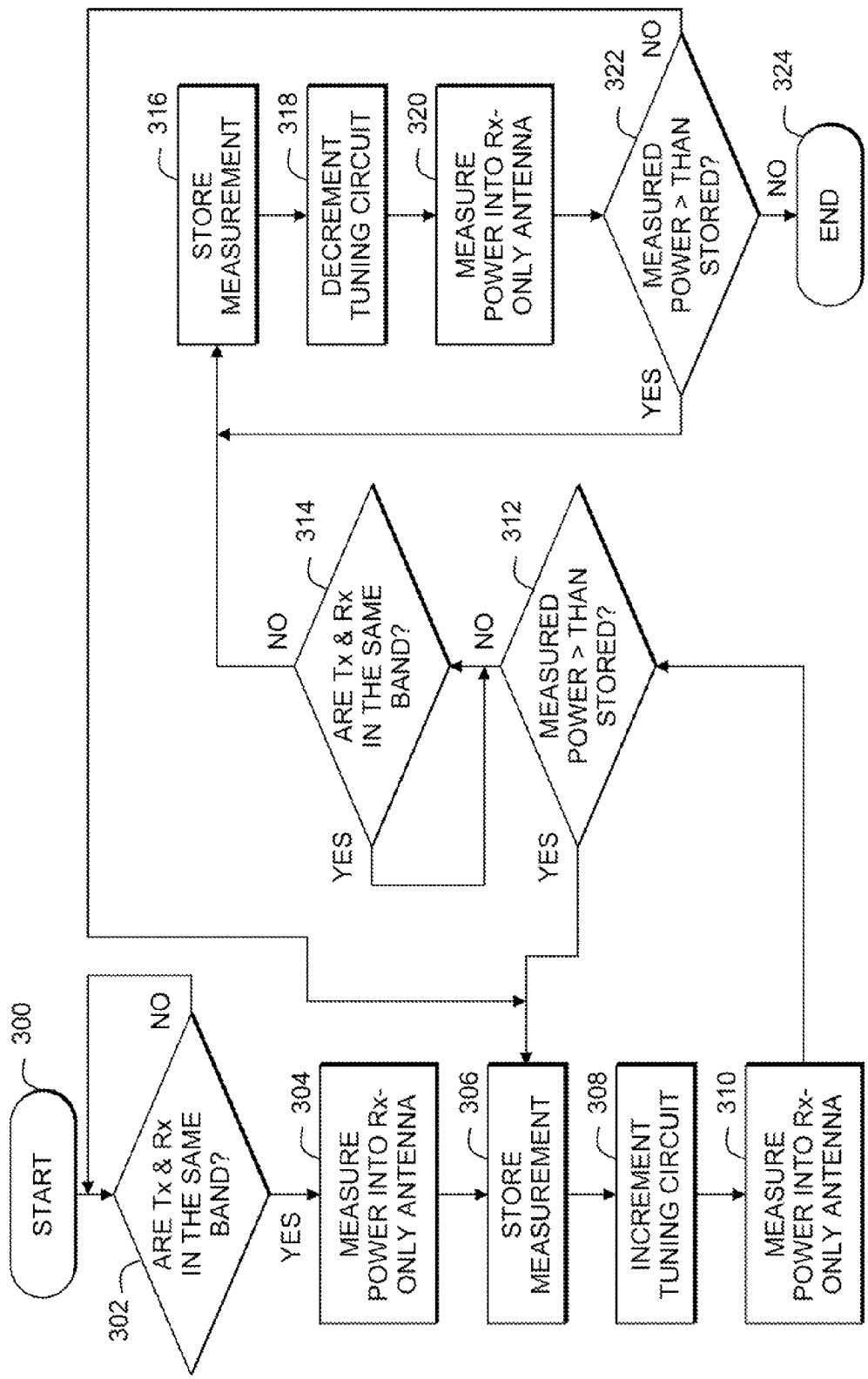
FIG. 3 is a flowchart of a method, in accordance with some embodiments of the present invention.

FIG. 3 illustrates a flowchart of a method for providing close proximity antenna measurement and tuning, in accordance with the present invention.

At the start, the present invention provides 300 a subscriber module with at least one receiver-only antenna and at least one antenna switchable between a transmit mode and a receive mode.

A next step includes determining 302 whether the antennas of the subscriber module are not all in receive mode and whether the transmit antenna and receive antenna are operating within the same frequency band. If both conditions are not met, the process keeps repeating this step.

A next step includes measuring 304 the power received into the receive-only antenna.

Another step includes storing 306 the measurement from step 304.

Another step includes incrementing 308 a change in a tuning circuit for the receive-only antenna.

Another step includes measuring 310 the power received into the receive-only antenna.

Another step includes determining 312 if the power measured in step 310 is greater than the power stored in step 306. If this condition is true, the process continues to, and repeats, steps 306, 308, 310 until the power measured in step 310 is no longer greater than the power stored in step 306 (i.e. the incremental tuning has passed maximum optimization), whereupon the process goes on to the next step.

A next step includes determining 314 whether the antennas of the subscriber module are not all in receive mode and whether the transmit antenna and receive antenna are operating within the same frequency band. If both conditions are not met, the process keeps repeating this step.

Another step includes storing 316 the measurement from step 310.

Another step includes decrementing 318 a change in the tuning circuit.

Another step includes measuring 320 the power received into the receive-only antenna.

Another step includes determining 322 if the power measured in step 320 is greater than the power stored in step 316. If this condition is true, the process continues to, and repeats, steps 316, 318, 320 until the power measured in step 320 is no longer greater than the power stored in step 316 (i.e. the decremental tuning has passed maximum optimization), whereupon the process can return to step 306 to keep hunting for optimal tuning, or end 324 for a predetermined amount of time before the process starts all over again.

Advantageously, the apparatus and method described herein provides a technique to tune a receive-only antenna of a subscriber module while in use. The same technique can be used to tune both the transmit mode and receive mode of a switchable Tx/Rx antenna.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, at least some of the functions of the method and/or apparatus described herein. Alternatively, at least some of the functions could be implemented by a state machine that has no stored program instructions, or in one or more application specific integrated circuits (ASICs), in which at least some function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A subscriber module for providing close proximity antenna measurement and tuning, the subscriber module comprising:
   at least a first antenna operable as a receive-only antenna;
   at least a second antenna operable in a transmit mode;
   a tuning circuit coupled to the first antenna;
   a transmitter coupled to the second antenna;
   a receiver coupled to the first antenna, the receiver operable to measure a power into the first antenna delivered by a signal from the second antenna driven by the transmitter; and
   a processor coupled to the tuning circuit, transmitter, and receiver, the processor operable to step changes in the tuning circuit until a substantially maximum power of the signal is measured by the receiver.

2. The module of claim 1, wherein the second antenna can also operate in a receive mode, and further comprising a switch coupled to the second antenna and operable to switch the second antenna to the transmit mode from the receive mode, and wherein the processor is operable to determine when the first and second antenna are operable within the same frequency band.

3. The module of claim 2, wherein the receiver includes an envelope detector operable over the frequency band.

4. The module of claim 1, wherein the processor will direct the receiver to make power measurements immediately before and after the first antenna tuning circuit step change.

5. The module of claim 1, wherein the processor will direct the receiver to make power measurements immediately before and after a transmitter power change.

6. The module of claim 1, wherein the processor is operable to step changes in the tuning circuit in one direction until the power measured by the receiver stops improving, and then step changes in the tuning circuit in the other direction until the power measured by the receiver stops improving.

7. The module of claim 6, wherein the processor is further operable to alternate incrementing and decrementing the step changes in the tuning circuit to maintain the first antenna tuning near a maximum power.

8. The module of claim 6, wherein processor is further operable to stop step changes for a predetermined period.

9. The module of claim 1, wherein the processor is operable to detect a relative change between a transmit power and a measured power for the first antenna for each step change in the tuning circuit.

10. The module of claim 1, further comprising a tuning circuit for the second antenna, the tuning circuit being coupled to the processor, wherein the processor is operable to step changes in the tuning circuit for the second antenna until a maximum power of the signal is measured by the receiver.

11. A subscriber module for providing close proximity antenna measurement and tuning, the subscriber module comprising:
   at least a first antenna operable as a receive-only antenna;
   at least a second antenna operable in a transmit mode of either a receive mode or a transmit mode;
   a switch coupled to the second antenna and operable to switch the second antenna between the receive mode and the transmit mode;
   a tuning circuit coupled to the first antenna;
   a transmitter coupled to the second antenna;
   a receiver coupled to the first antenna, the receiver operable to measure a power into the first antenna delivered by a signal from the second antenna driven by the transmitter; and
   a processor coupled to the tuning circuit, transmitter, and receiver, the processor operable to:
      determine when the first and second antennas are operable within the same frequency band,
      direct the receiver to measure the power into the first antenna delivered by the signal from the second antenna driven by the transmitter, and step changes in the tuning circuit in one direction until the power measured by the receiver stops improving, and then step changes in the tuning circuit in the other direction until the power measured by the receiver stops improving.

12. A method for providing close proximity antenna measurement and tuning, the method comprising the steps of:

provinding a subscriber module with at least one receiver-only antenna and at least one antenna switchable between a transmit mode and a receive mode;

determining whether the antennas of the subscriber module are not all in receive mode and whether the transmit antenna and receive antenna are operating within the same frequency band;

measuring the power received into the receive-only antenna;

storing the measurement from the previous measuring step;

incrementing a change in a tuning circuit for the receive-only antenna;

measuring the power received into the receive-only antenna;

determining if the power measured in the previous measuring step is greater than the power stored in the storing step, whereupon proceeding to the previous storing step;

determining whether the antennas of the subscriber module are not all in receive mode and whether the transmit antenna and receive antenna are operating within the same frequency band;

storing the measurement from the previous determining step;

decrementing a change in a tuning circuit for the receive-only antenna;

measuring the power received into the receive-only antenna; and determining if the power measured in the previous measuring step is greater than the power stored in the immediately previous storing step, whereupon proceeding to the immediately previous storing step.

* * * * *